(12) United States Patent
Yang et al.

(10) Patent No.: US 11,438,846 B2
(45) Date of Patent: Sep. 6, 2022

(54) SOLUTIONS TO HANDLE MIS-ALIGNMENT BETWEEN RADIO ACCESS TECHNOLOGIES (RATS) IN DUAL CONNECTIVITY (DC)

(71) Applicant: QUALCOMM Incorporated, San Diego, CA (US)

(72) Inventors: Wei Yang, San Diego, CA (US); Amir Aminzadeh Gohari, Sunnyvale, CA (US); Yi Huang, San Diego, CA (US); Peter Gaal, San Diego, CA (US); Chao Jin, San Diego, CA (US); Amir Farajidana, Sunnyvale, CA (US); Alexei Yurievitch Gorokhov, San Diego, CA (US); Rebecca Wen-ling Yuan, San Diego, CA (US); Vishal Mahajan, Dublin, CA (US); Tarandeep Virk, San Diego, CA (US); Christos Komninakis, Solana Beach, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/544,819

(22) Filed: Aug. 19, 2019

(65) Prior Publication Data
US 2020/0059868 A1  Feb. 20, 2020

Related U.S. Application Data

(60) Provisional application No. 62/720,096, filed on Aug. 20, 2018.

(51) Int. Cl.
*H04W 72/04* (2009.01)
*H04W 52/14* (2009.01)
(Continued)

(52) U.S. Cl.
CPC .......... *H04W 52/146* (2013.01); *H04B 1/713* (2013.01); *H04L 5/0094* (2013.01);
(Continued)

(58) Field of Classification Search
CPC ......... H04B 17/13; H04B 1/713; H04L 5/001; H04L 5/0048; H04L 5/0094;
(Continued)

(56) References Cited

U.S. PATENT DOCUMENTS 9,648,573 B2 * 5/2017 Siomina ............... H04W 56/001
10,708,935 B2 * 7/2020 Yang .................... H04L 5/0064
(Continued)

OTHER PUBLICATIONS

Ericsson: "MRTD and MTTD Requirements for Inter-Band Synchronous EN-DC", 3GPP Draft; R4-1802507 UL PC Issues Inter-Band Synch REV03, 3RD Generation Partnership Project (3GPP), Mobile Competence Centre ; 650, Route Des Lucioles; F-06921 Sophia-Antipolis Cedex; France, vol. RAN WG4, No. Athens, Greece; Feb. 26, 2018-Mar. 2, 2018, Feb. 19, 2018 (Feb. 19, 2018), XP051402683, 5 Pages, Retrieved from the Internet: URL:http://www.3gpp.org/ftp/tsg%5Fran/WG4%5FRadio/TSGR4%5F86/Docs/ [retrieved on Feb. 19, 2018], section 3.2, section 4.
(Continued)

*Primary Examiner* — Phuc H Tran
(74) *Attorney, Agent, or Firm* — Shumaker & Sieffer, P.A.

(57) ABSTRACT

Certain aspects of the present disclosure relate to methods and apparatus for maintaining phase coherency in the event of changes to uplink transmit power. For example, the techniques described herein may help mitigate the impact on phase continuity of uplink transmissions by UEs capable of dual connectivity (DC).

25 Claims, 9 Drawing Sheets

(51) Int. Cl.
*H04W 74/08* (2009.01)
*H04B 1/713* (2011.01)
*H04L 5/00* (2006.01)

(52) U.S. Cl.
CPC ... *H04W 72/0453* (2013.01); *H04W 72/0473* (2013.01); *H04W 74/0833* (2013.01)

(58) Field of Classification Search
CPC ............. H04W 52/146; H04W 52/325; H04W 52/367; H04W 52/50; H04W 52/52; H04W 56/0005; H04W 72/0453; H04W 72/0473; H04W 74/0833; H04W 76/15; H04W 88/06
See application file for complete search history.

(56) References Cited

U.S. PATENT DOCUMENTS

| | | | | |
|---|---|---|---|---|
| 2014/0335883 | A1* | 11/2014 | Ericson | H04L 5/0048 455/452.2 |
| 2015/0189610 | A1* | 7/2015 | Siomina | H04L 5/14 370/280 |
| 2017/0063442 | A1* | 3/2017 | Kazmi | H04B 7/0413 |
| 2017/0373739 | A1* | 12/2017 | Guo | H04B 7/0404 |
| 2019/0053292 | A1* | 2/2019 | Ali | H04W 76/16 |
| 2019/0068234 | A1* | 2/2019 | Khlat | H04B 1/40 |
| 2019/0081763 | A1* | 3/2019 | Akkarakaran | H04L 1/1607 |
| 2019/0141767 | A1* | 5/2019 | Wang | H04L 5/001 |
| 2020/0068504 | A1* | 2/2020 | Yi | H04W 52/14 |
| 2020/0169958 | A1* | 5/2020 | Lee | H04W 52/146 |
| 2020/0259696 | A1* | 8/2020 | Sun | H04L 5/0048 |
| 2020/0344819 | A1* | 10/2020 | Myung | H04W 74/0808 |
| 2021/0037397 | A1* | 2/2021 | Guo | H04L 5/0023 |

OTHER PUBLICATIONS

Ericsson: "MRTD and MTTD Requirements for Synchronous NR-NR DC", 3GPP Draft; R4-1810924 Discussion Paper MRTD and MTTD for NR-NR DC, 3RD Generation Partnership Project (3GPP), Mobile Competence Centre; 650, Route Des Lucioles; F-06921 Sophia-Antipolis Cedex; France, vol. RAN WG4, No. Gothenburg, Sweden; Aug. 20, 2018-Aug. 24, 2018, Aug. 10, 2018 (Aug. 10, 2018), XP051579847, 4 Page, Retrieved from the Internet: URL:http://www.3gpp.org/ftp/tsg%5Fran/WG4%5FRadio/TSGR4%5F88/Docs/R4%2D1810924%2Ezip [retrieved on Aug. 10, 2018], section 2; p. 2.

Fujitsu: "Remaining Issues for Power Control Priority Rules in Dual Connectivity", 3GPP Draft; R1-143836_DC Power Final, 3RD Generation Partnership Project (3GPP), Mobile Competence Centre; 650, Route Des Lucioles; F-06921 Sophia-Antipolis Cedex; France, vol. RAN WG 1, No. Ljubljana, Slovenia; Oct. 6, 2014-Oct. 10, 2014, Oct. 5, 2014 (Oct. 5, 2014), XP050875154, 3 Pages, Retrieved from the Internet: URL:http://www.3gpp.org/ftp/Meetings_3GPP_SYNC/RAN1/Docs/ [retrieved on Oct. 5, 2014], Section 2.5.

Intel Corporation: "On Dual Connectivity DC_71-n71 Support", 3GPP Draft; R4-1712336 on DC_71-N71 Support R08, 3RD Generation Partnership Project (3GPP), Mobile Competence Centre; 650, Route Des Lucioles; F-06921 Sophia-Antipolis Cedex; France, vol. RAN WG4, No. Reno, Nevada; Nov. 27, 2017-Dec. 1, 2017, Nov. 17, 2017 (Nov. 17, 2017), XP051375162, 4 Pages, Retrieved from the Internet: URL:http://www.3gpp.org/ftp/tsg%5Fran/WG4%5FRadio/TSGR4%5F85/Docs/ [retrieved on Nov. 17, 2017], section 2.

Intel Corporation: "Remaining Issues of NR-LTE Co-Existence", 3GPP Draft; R1-1808675, 3RD Generation Partnership Project (3GPP), Mobile Competence Centre; 650, Route Des Lucioles; F-06921 Sophia-Antipolis Cedex; France, vol. RAN WG1, No. Gothenburg, Sweden; Aug. 20, 2018-Aug. 24, 2018, Aug. 11, 2018 (Aug. 11, 2018), XP051516050, 3 Pages, Retrieved from the Internet: URL:http://www.3gpp.org/ftp/tsg%5Fran/WG1%5FRL1/TSGR1%5F94/Docs/R1%2D1808675%2Ezip [retrieved on Aug. 11, 2018], section 2.1, section 2.1.1.

International Search Report and Written Opinion—PCT/US2019/047222—ISA/EPO—dated Nov. 8, 2019.

Qualcomm: "Proposals on LTE-NR Coexistence", 3GPP Draft; R1-1807693 Proposals on LTE-NR Coexistence, 3RD Generation Partnership Project (3GPP), Mobile Competence Centre; 650, Route Des Lucioles; F-06921 Sophia-Antipolis Cedex; France, vol. RAN WG1, No. Busan, Korea; May 21, 2018-May 25, 2018, May 24, 2018 (May 24, 2018), XP051463321, 16 Pages, Retrieved from the Internet: URL:http://www.3gpp.org/ftp/tsg%5Fran/WG1%5FRL1/TSGR1%5F93/Docs [retrieved on May 24, 2018], slide 10.

* cited by examiner

SOLUTIONS TO HANDLE MIS-ALIGNMENT BETWEEN RADIO ACCESS TECHNOLOGIES (RATS) IN DUAL CONNECTIVITY (DC)

CLAIM OF PRIORITY UNDER 35 U.S.C. § 119

The present Application for Patent claims benefit of U.S. Provisional Patent Application Ser. No. 62/720,096, filed Aug. 20, 2018, assigned to the assignee hereof and hereby expressly incorporated by reference herein.

FIELD

The present disclosure relates generally to communication systems and methods and apparatus for handling possible phase coherency issues caused by transmission power changes in different radio access technologies in a dual connectivity (DC) user equipment (UE).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In LTE or LTE-A network, a set of one or more base stations may define an e NodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, gNB, gNodeB, eNB, etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communications by a network entity. The method generally includes determining a user equipment (UE) is sharing a same power amplifier to support at least first and second radio access technologies (RATs) and taking one or more actions to reduce the impact of phase coherence due to uplink transmission power changes at the UE in the first and second RATs.

Certain aspects provide a method for wireless communications by a user equipment (UE). The method generally includes determining the UE is sharing a same power amplifier to support at least first and second radio access technologies (RATs) and taking one or more actions to reduce the impact of phase coherence due to uplink transmission power changes at the UE in the first and second RATs.

Aspects generally include methods, apparatus, systems, computer readable mediums, and processing systems, as substantially described herein with reference to and as illustrated by the accompanying drawings.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Figure 1:
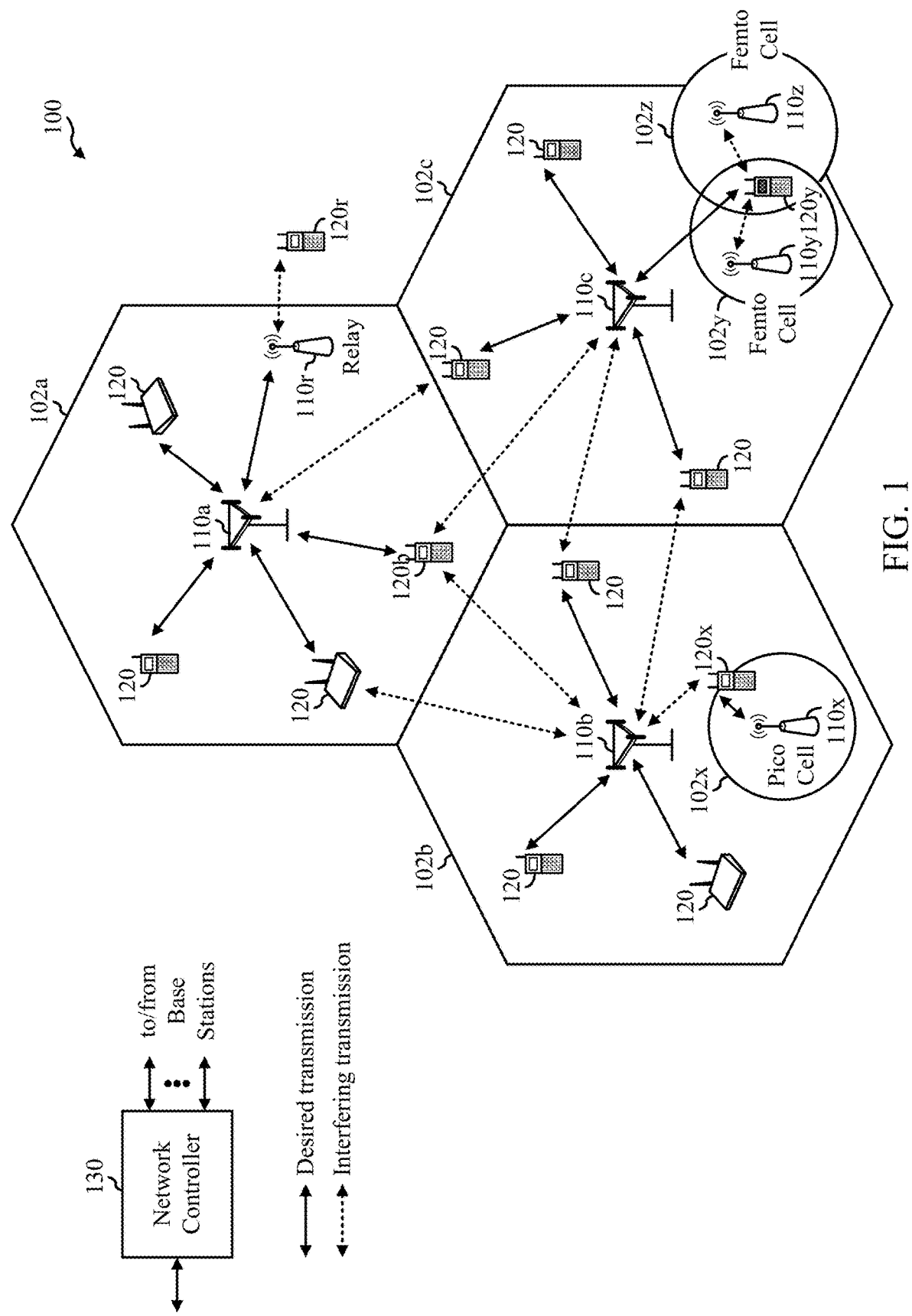
FIG. 1 is a block diagram conceptually illustrating an example telecommunications system, in accordance with certain aspects of the present disclosure.

Aspects of the present disclosure relate to systems and method for handling possible phase coherency issues caused by transmission power changes in different radio access technologies in a dual connectivity (DC) user equipment (UE). For example, upon determining a user equipment (UE) is sharing a same power amplifier to support first and second radio access technologies (e.g., LTE and NR), a base station may take one or more actions to reduce the impact on phase coherence due to uplink transmission power changes at the UE in the first and second RATs.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (SGTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies.

For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

FIG. 1 illustrates an example wireless network 100, such as a new radio (NR) or 5G network, in which aspects of the present disclosure may be performed. For example, in certain aspects, a BS 110 may be configured to take one or more actions designed to mitigate possible phase coherency issues caused by transmission power changes in different radio access technologies in a dual connectivity (DC) user equipment (UE) 120.

As illustrated in FIG. 1, the wireless network 100 may include a number of BSs 110 and other network entities. A BS may be a station that communicates with UEs. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and eNB, gNB, gNodeB, Node B, 5G NB, AP, NR BS, NR BS, or TRP may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may be coupled to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices.

In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

In certain aspects, as shown, a UE 120 may be configured to transmit signals on an uplink to the BS 110. The BS 110 may be configured to configure the UE 120 to perform uplink power control on the uplink, according to the techniques discussed herein.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using time division duplex (TDD). A single component carrier bandwidth of 100 MHz may be supported. NR resource blocks may span 12 sub-carriers with a sub-carrier bandwidth of 75 kHz over a 0.1 ms duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such CUs and/or DUs.

In some examples, access to the air interface may be scheduled, wherein a scheduling entity (e.g., abase station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As noted above, a RAN may include a CU and DUs. A NR BS (e.g., eNB, 5G Node B, Node B, transmission reception point (TRP), access point (AP)) may correspond to one or multiple BSs. NR cells can be configured as access cell (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases DCells may not transmit synchronization signals—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 2:
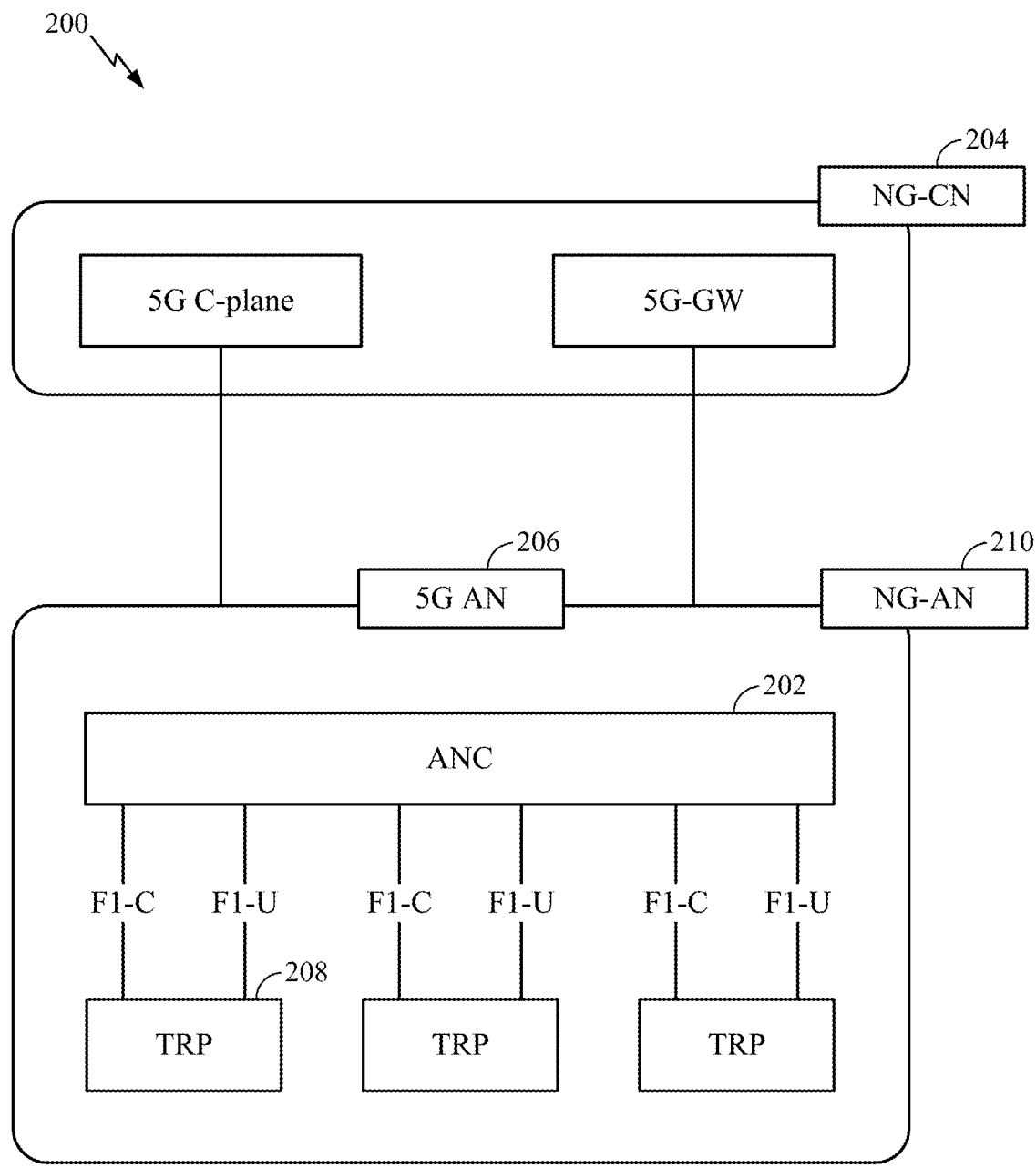
FIG. 2 is a block diagram illustrating an example logical architecture of a distributed RAN, in accordance with certain aspects of the present disclosure.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC may be a central unit (CU) of the distributed RAN 200. The backhaul interface to the next generation core network (NG-CN) 204 may terminate at the ANC. The backhaul interface to neighboring next generation access nodes (NG-ANs) may terminate at the ANC. The ANC may include one or more TRPs 208 (which may also be referred to as BSs, NR BSs, Node Bs, 5G NBs, APs, or some other term). As described above, a TRP may be used interchangeably with "cell."

The TRPs 208 may be a DU. The TRPs may be connected to one ANC (ANC 202) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture 200 may be used to illustrate fronthaul definition. The architecture may be defined that support fronthauling solutions across different deployment types. For example, the architecture may be based on transmit network capabilities (e.g., bandwidth, latency, and/or jitter).

The architecture may share features and/or components with LTE. According to aspects, the next generation AN (NG-AN) 210 may support dual connectivity with NR. The NG-AN may share a common fronthaul for LTE and NR.

The architecture may enable cooperation between and among TRPs 208. For example, cooperation may be preset within a TRP and/or across TRPs via the ANC 202. According to aspects, no inter-TRP interface may be needed/present.

According to aspects, a dynamic configuration of split logical functions may be present within the architecture 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively). According to certain aspects, a BS may include a central unit (CU) (e.g., ANC 202) and/or one or more distributed units (e.g., one or more TRPs 208).

Figure 3:
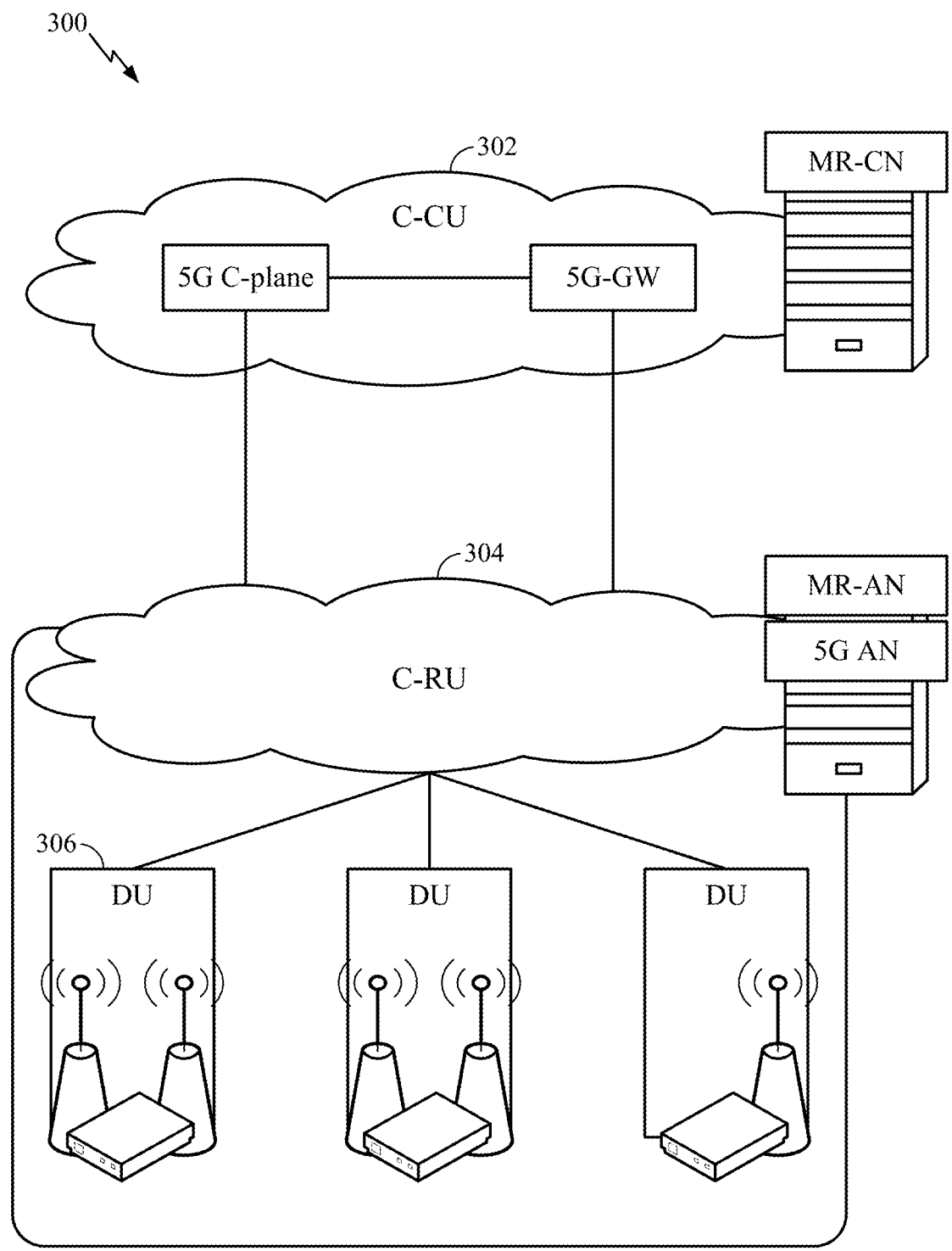
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU may be centrally deployed. C-CU functionality may be offloaded (e.g., to advanced wireless services (AWS)), in an effort to handle peak capacity.

A centralized RAN unit (C-RU) 304 may host one or more ANC functions. Optionally, the C-RU may host core network functions locally. The C-RU may have distributed deployment. The C-RU may be closer to the network edge.

A DU 306 may host one or more TRPs (edge node (EN), an edge unit (EU), a radio head (RH), a smart radio head (SRH), or the like). The DU may be located at edges of the network with radio frequency (RF) functionality.

Figure 4:
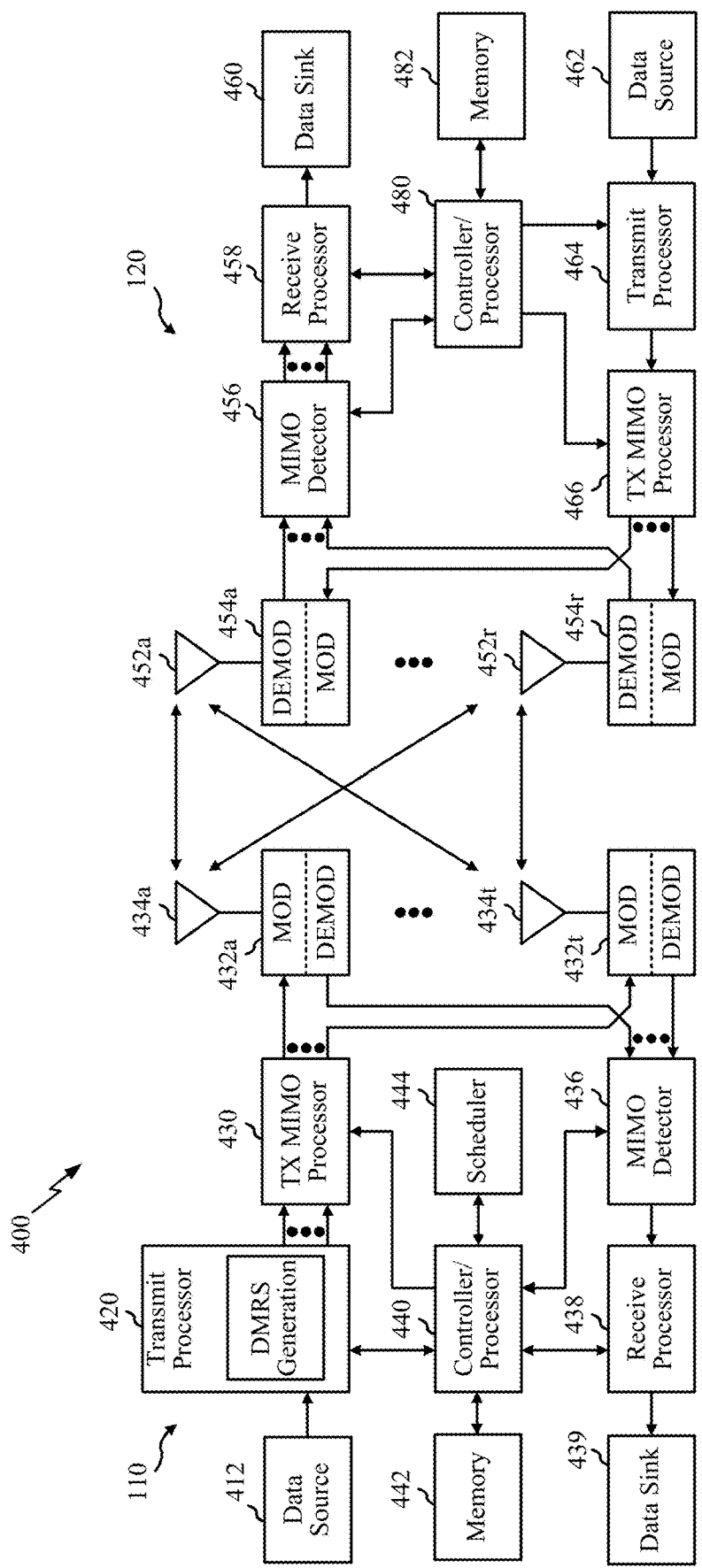
FIG. 4 is a block diagram conceptually illustrating a design of an example BS and user equipment (UE), in accordance with certain aspects of the present disclosure.

FIG. 4 illustrates example components of the BS 110 and UE 120 illustrated in FIG. 1, which may be used to implement aspects of the present disclosure. As described above, the BS may include a TRP. One or more components of the BS 110 and UE 120 may be used to practice aspects of the present disclosure. For example, antennas 452, Tx/Rx 222, processors 466, 458, 464, and/or controller/processor 480 of the UE 120 and/or antennas 434, processors 460, 420, 438, and/or controller/processor 440 of the BS 110 may be used to perform the operations described herein.

FIG. 4 shows a block diagram of a design of a BS 110 and a UE 120, which may be one of the BSs and one of the UEs in FIG. 1. For a restricted association scenario, the base station 110 may be the macro BS 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, DMRS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DE-MODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the base station 110 may perform or direct processes for the techniques described herein. The processor 480 and/or other processors and modules at the UE 120 may also perform or direct processes for the techniques described herein. The memories 442 and 482 may store data and program codes for the BS 110 and the UE 120, respectively. A scheduler 444 may schedule UEs for data transmission on the downlink and/or uplink.

Figure 5:
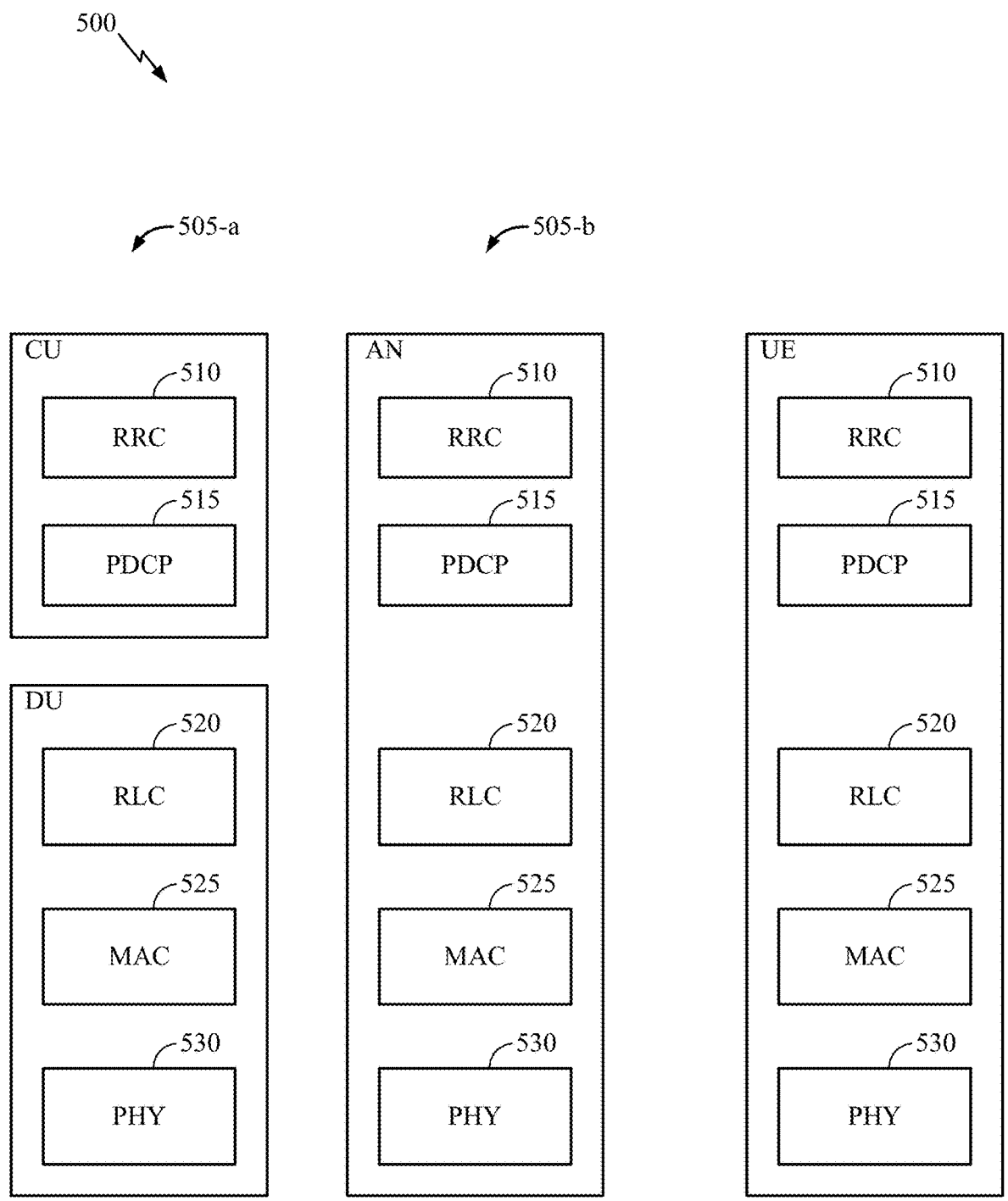
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a in a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device (e.g., access node (AN), new radio base station (NR BS), a new radio Node-B (NR NB), a network node (NN), or the like.). In the second option, the RRC layer 510, the PDCP layer 515, the RLC layer 520, the MAC layer 525, and the PHY layer 530 may each be implemented by the AN. The second option 505-b may be useful in a femto cell deployment.

Regardless of whether a network access device implements part or all of a protocol stack, a UE may implement an entire protocol stack (e.g., the RRC layer 510, the PDCP layer 515, the RLC layer 520, the MAC layer 525, and the PHY layer 530).

Figure 6:
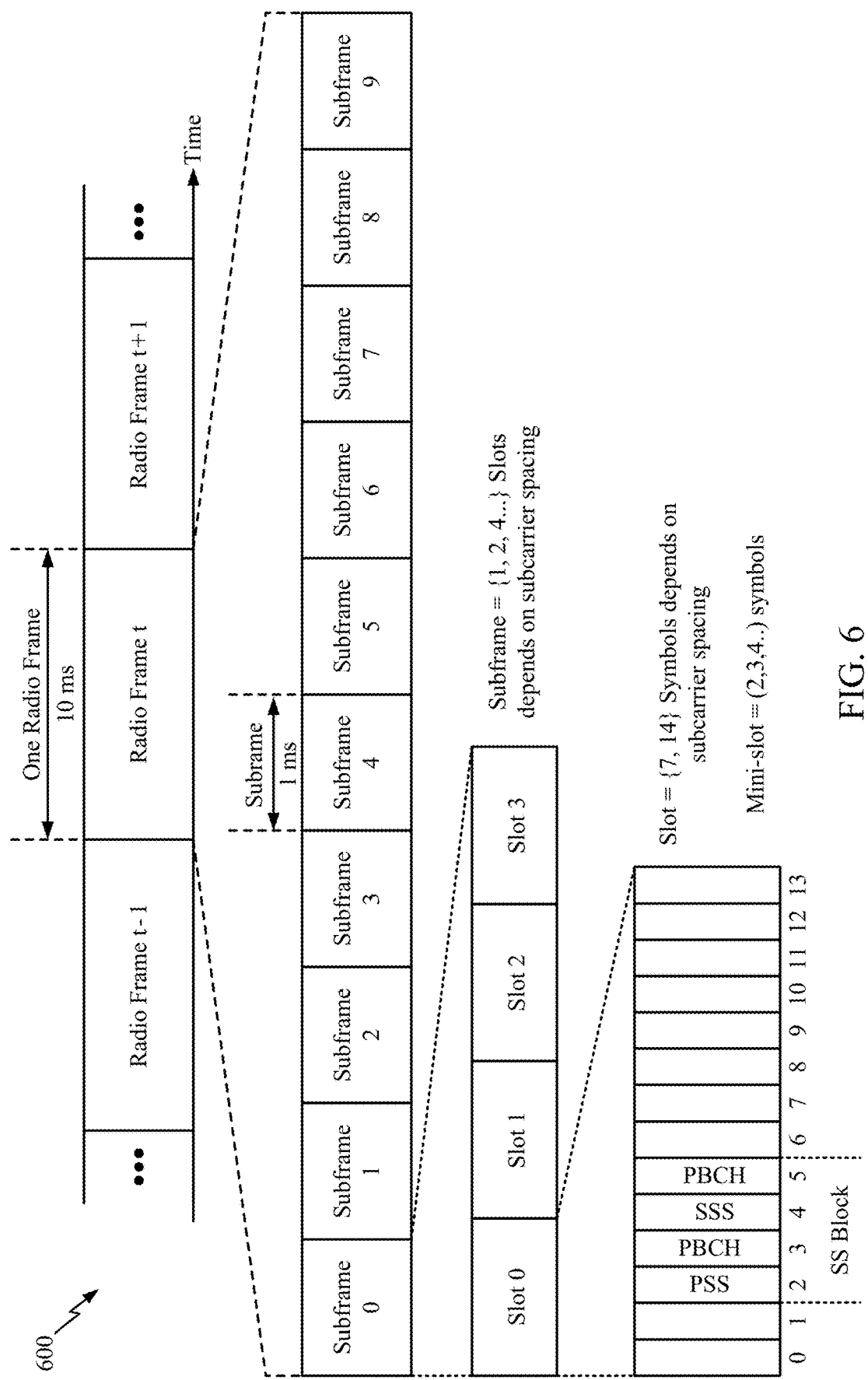
FIG. 6 illustrates an example of a frame format for a new radio (NR) system, in accordance with certain aspects of the present disclosure.

FIG. 6 is a diagram 600 showing an example of a DL-centric subframe. The DL-centric subframe may include a control portion 602. The control portion 602 may exist in the initial or beginning portion of the DL-centric subframe. The control portion 602 may include various scheduling information and/or control information corresponding to various portions of the DL-centric subframe. In some configurations, the control portion 602 may be a physical DL control channel (PDCCH), as indicated in FIG. 6. The DL-centric subframe may also include a DL data portion 604. The DL data portion 604 may sometimes be referred to as the payload of the DL-centric subframe. The DL data portion 604 may include the communication resources utilized to communicate DL data from the scheduling entity (e.g., UE or BS) to the subordinate entity (e.g., UE). In some configurations, the DL data portion 604 may be a physical DL shared channel (PDSCH).

The DL-centric subframe may also include a common UL portion 606. The common UL portion 606 may sometimes be referred to as an UL burst, a common UL burst, and/or various other suitable terms. The common UL portion 606 may include feedback information corresponding to various other portions of the DL-centric subframe. For example, the common UL portion 606 may include feedback information corresponding to the control portion 602. Non-limiting examples of feedback information may include an ACK signal, a NACK signal, a HARQ indicator, and/or various other suitable types of information. The common UL portion 606 may include additional or alternative information, such as information pertaining to random access channel (RACH) procedures, scheduling requests (SRs), and various other suitable types of information. As illustrated in FIG. 6, the end of the DL data portion 604 may be separated in time from the beginning of the common UL portion 606. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

FIG. 7 is a diagram 700 showing an example of an UL-centric subframe. The UL-centric subframe may include a control portion 702. The control portion 702 may exist in the initial or beginning portion of the UL-centric subframe. The control portion 702 in FIG. 7 may be similar to the control portion described above with reference to FIG. 6. The UL-centric subframe may also include an UL data portion 704. The UL data portion 704 may sometimes be referred to as the payload of the UL-centric subframe. The UL portion may refer to the communication resources utilized to communicate UL data from the subordinate entity (e.g., UE) to the scheduling entity (e.g., UE or BS). In some configurations, the control portion 702 may be a physical DL control channel (PDCCH).

As illustrated in FIG. 7, the end of the control portion 702 may be separated in time from the beginning of the UL data portion 704. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe may also include a common UL portion 706. The common UL portion 706 in FIG. 7 may be similar to the common UL portion 706 described above with reference to FIG. 7. The common UL portion 706 may additional or alternative include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example Solutions to Handle MIS-Alignment
Between Radio Access Technologies (RATS) in
Dual Connectivity (DC)

Aspects of the present disclosure generally relate to techniques that may help support systems in which user equipments (UE) are capable of dual connectivity (DC). For example, the techniques may be used to mitigate the impact on phase continuity of uplink transmissions by UEs that support E-UTRAN New Radio-Dual Connectivity (EN-DC), where E-UTRAN refers to LTE and New Radio refers to 5G. As will be described in greater detail below, a BS (e.g., an eNB/gNB) may take one or more actions designed to mitigate possible loss of phase continuity caused by changes in transmission power changes when common transmit (Tx) RF chain components are shared across the different radio access technologies (RATs).

In order to measure frequency offset by comparing the phase of reference symbols in different transmission time intervals (TTIs—e.g., across subframe and slot boundaries), it is important that there be an adequate level of continuity in phase across different TTIs. As used herein, phase continuity (or phase coherence) generally refers to the ability to consider the underlying carrier signal for the transmissions in the different TTIs as a continuous signal. As such, given knowledge of the carrier signal frequency, the phase of the carrier signal at a given point in one TTI can be accurately predicted from the phase of the carrier signal at a given point in the other TTI. Phase continuity between TTIs at the transmitter end of a link is important if a frequency offset is to be measured using reference symbols from the two different TTIs at the receiver end.

Figure 7A:
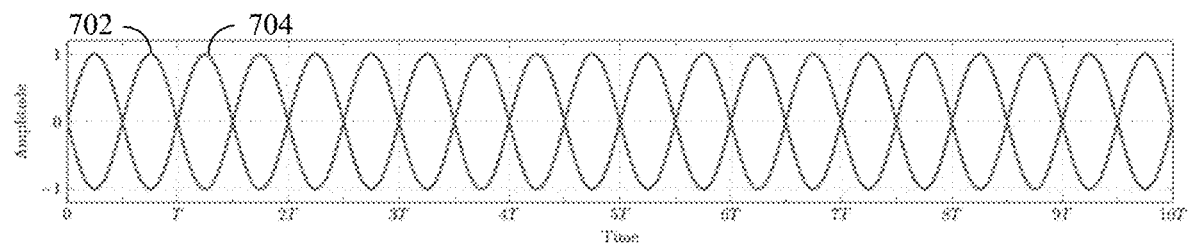
FIGS. 7A and 7B illustrate examples of signals with ideal phase coherence and phase drift, respectively.
Figure 7B:
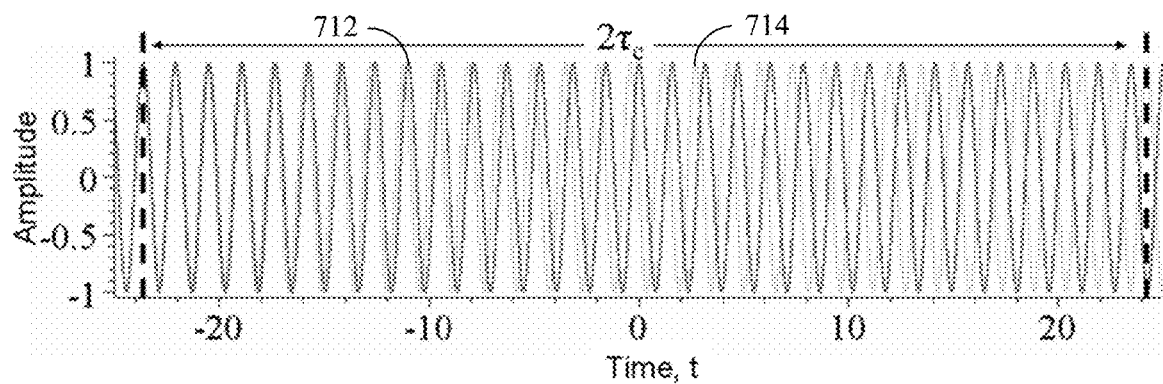

FIGS. 7A and 7B illustrate examples of signals with ideal phase continuity and typical phase drift, respectively. As illustrated in FIG. 7A, the amplitude of a single frequency wave (702) as a function of time t and a copy 704 of the same wave delayed by τ. As illustrated, waves 702 and 704 have a constant phase difference. While the waveforms shown in FIG. 7A represent an ideal scenario, most signals experience phase continuity only over a fixed coherence time τc and experience significant drift outside of that time. For example, FIG. 7B illustrates an example of waves 712 and 714 that is a copy of the wave 712, but delayed by 2τc. Initially, at certain times of t the wave can interfere perfectly with its delayed copy, which is important for orthogonality purposes. Unfortunately, in this example, half the time waves 712 and 714 are in phase and half the time out of phase.

To achieve higher spectral efficiencies, uplink transmissions often employ high-order modulation schemes, such as 256-ary quadrature amplitude modulation (256-QAM) or 1024-QAM. Unfortunately, systems utilizing high-order modulations are very vulnerable to phase noise (PN) or drift, which can cause a loos in orthogonality among subcarriers and distort the received signals. Various components in a transmit RF chain can have an effect on phase, such as the power amplifier (PA) and switching in the step attenuator. The amplifier drive level and rapid power changes, for example, may cause significant changes to the phase, making it difficult to maintain phase continuity.

As noted above, aspects of the present disclosure provide techniques that may help mitigate the impact on phase continuity for uplink transmissions from a UE configured to support dual connectivity (DC), to communicate in at least two radio access technologies. For example, the techniques may be applied to mitigate the impact on phase continuity for uplink transmissions from a UE configured to support LTE and NR, implementing intra-band EN-DC. The following description refers to EN-DC as a particular example scenario in which the techniques presented herein may be utilized. However, the techniques may be more broadly utilized in any other type of deployment where a UE supports multiple RATs that may be subject to phase continuity issues.

There are typically two design choices for transmit RF chain design for a UE when implementing support for intra-band EN-DC. One design choice is to use (share) a same PA (and other RF chain components) for both LTE and NR transmissions. Another choice is to use different PAs and other separate RF chain components for LTE and NR.

Unfortunately, as described above, maintaining phase continuity (absolute phase) for the first design choice that uses the same PA/RF-chain components presents challenges if the transmission power changes in time. Transmission power may change, for example, if one RAT calls for a change in transmission power before a transmission in the other RAT is complete). In such cases, if NR and LTE share the same PA/RF chain, power change in one tech impacts the other RAT too.

In some cases, which scenario (band/band combination) uses the same PA may be determined, for example, based on reference designs in a standard, such as 3GPP RAN4 (38.101), for each band combination. Examples of combinations include E-UTRA band 41 and NR band n41, as well as E-UTRA band 71 and NR band n71 cases. The assumptions for these example combinations may be different. For example, the assumption for the combination involving E-UTRA band71 may be that the UE uses a shared PA, while the assumption for the combination involving E-UTRAN band 41 may be that the UE uses two PAs.

In general, if different subcarrier spacings (SCSs) are used on the band combination (between NR and LTE), it may be more likely to use a two PA design. In some cases, a UE's local oscillator (LO) placement, signal routing, and/or antenna connections can indicate that a shared PA is used. On the other hand, with two PAs, there are likely two LOs placed (operating) within the BW of each RAT. As such, LO leakage can also be measured as an indication of whether a shared PA or separate PAs are used.

Aspects of the present disclosure provide techniques that may help maintain phase coherency in scenarios where a UE uses a same PA/RF-chain to support dual connectivity (e.g., an EN-DC UE).

Figure 8:
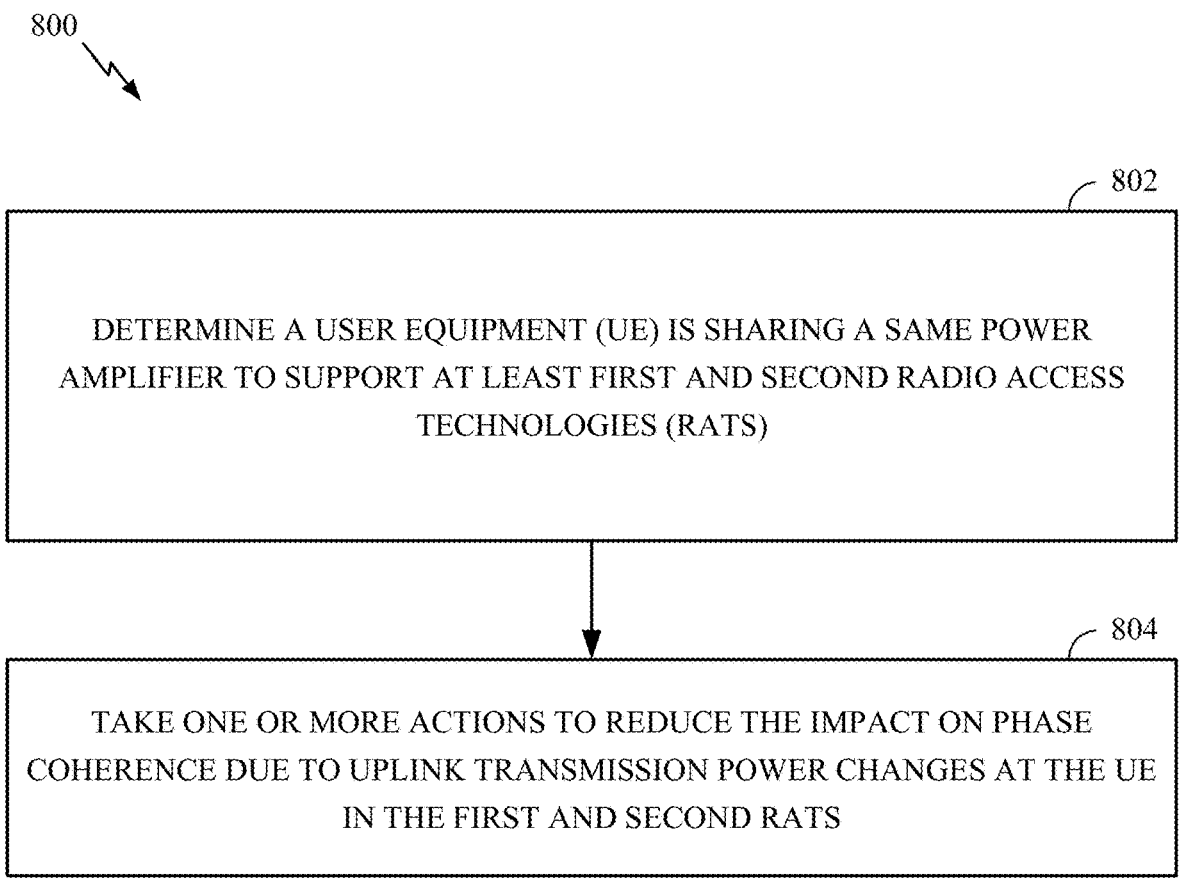
FIG. 8 illustrates example operations for wireless communication by a network entity, in accordance with certain aspects.

FIG. 8 illustrates example operations 800 for wireless communications by a network entity in a manner designed to reduce the impact on phase coherency due to transmission power changes at the UE for transmission in different RATs (e.g., NR and LTE). Operations 800 may be performed, for example, by a base station 110 (e.g., an eNB/gNB) of FIG. 1 communicating with a UE 120 operating in an EN-DC mode.

Operations 800 begin, at 802, by determining a user equipment (UE) is sharing a same power amplifier to support at least first and second radio access technologies (RATs). In some cases, the determination may be made based on capability information provided by the UE. In other cases, the determination may be made based on an assumption, for example, if it is assumed (e.g., in a standard definition) that a UE uses a shared PA for certain band combination, as noted above.

At 804, the network entity takes one or more actions to reduce the impact on phase coherence due to uplink transmission power changes at the UE in the first and second RATs. As will be described in greater detail below, the actions may be designed to ensure that transmission boundaries and locations with possible uplink transmission power changes in the first and second RATs are aligned.

Figure 9:
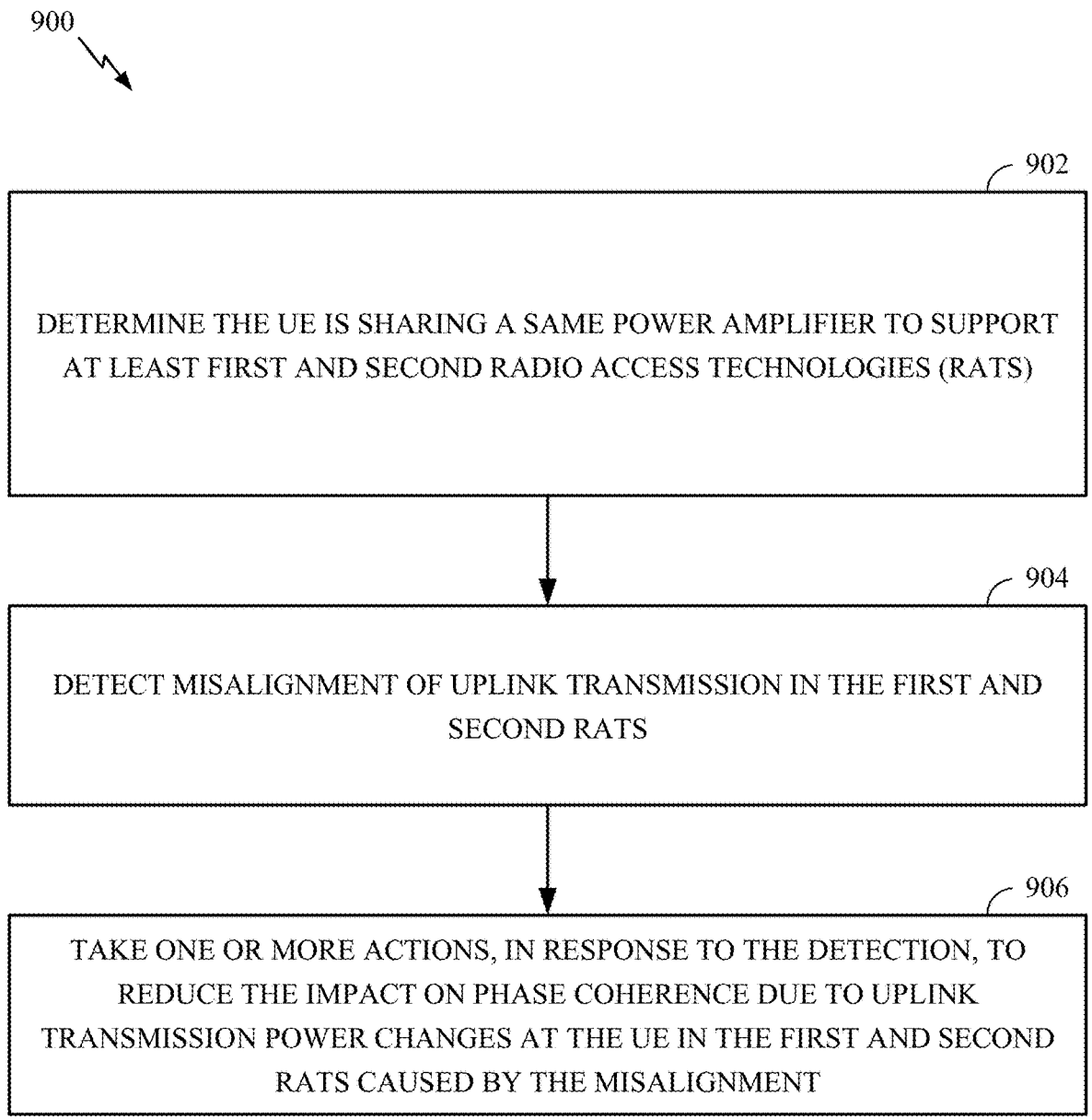
FIG. 9 illustrates example operations for wireless communication by a user equipment (UE), in accordance with certain aspects To facilitate understanding, identical reference numerals have been used, where possible, to designate identical elements that are common to the figures. It is contemplated that elements disclosed in one aspect may be beneficially utilized on other aspects without specific recitation.

FIG. 9 illustrates example operations 900 for wireless communications by a UE in a manner designed to reduce the impact on phase coherency due to transmission power changes at the UE for transmission in different RATs (e.g., NR and LTE). For example, operations 900 may be performed by a UE 120 of FIG. 1 operating in an EN-DC mode. In some cases, the UE performing operations 900 may be communicating with a network entity performing operations 800, resulting in what may be considered a combined network and UE-based solution.

Operations 900 begin, at 902, by determining the UE is sharing a same power amplifier to support at least first and second radio access technologies (RATs). At 904, the UE detects misalignment of uplink transmissions in the first and second RATs. At 906, the UE takes one or more actions, in response to the detection, to reduce the impact of phase coherence due to uplink transmission power changes at the UE in the first and second RATs caused by the misalignment.

In some cases, a network entity performing operations 800 to mitigate the impact on phase continuity due to transmission power changes at the UE for transmission in different RATs (without direct assistance from the UE) may be considered a network (NW) driven solution. In such cases, for example, a gNB/eNB may take action to align NR and LTE slots.

In such case, the phase coherence issue may be addressed by attempting to ensure that LTE and slot transmission boundaries and locations with possible power change are (fully) aligned.

If SCS is the same (e.g., 15 KHZ) in each RAT, and symbol boundaries are aligned (sync network), then UL Timing may be aligned with relatively minimal error (<tens to hundreds of ns).

In some cases, a UE may be configured (or an eNB/gNB may schedule a UE) such that different types of uplink channels (e.g., PUSCH, PUCCH, SRS, and PRACH) follow the same pattern in each RAT (e.g., between LTE and NR). For example, the starting and ending symbol between transmissions of such channels in different RATs may be aligned. In some cases, frequency hopping locations may also be aligned within channels.

In some cases, a network entity and/or UE may be configured to handle random access channel (RACH) procedures in a special manner (as it may not always be possible for RACH timing to be controlled in the same manner as other types of channels). In some cases, while RACH timing is difficult to control, at least RACH occasions (opportunities in which RACH transmissions are allowed) for the different RATs may be aligned.

In some cases, at least one portion of the RACH procedure in one RAT may be given priority over other types of transmissions in another RAT. For example, the NR RACH procedure (preamble, MSG3, and MSG4 ACK) may be given priority over the LTE transmission of various non-RACH related channels (e.g., PUSCH, PUCCH and SRS).

In some cases, in the event of LTE and NR RACH procedures overlapping (e.g., simultaneous RACH), at least one portion of the RACH procedure in one RAT may be prioritized over at least one portion of the RACH procedure in the other RAT.

There are various options to handle the event that uplink transmissions in the first and second RATs are misaligned (e.g., and they are not readily aligned by network and/or UE actions). As used herein, misalignment may refer to different conditions, such as different starting/ending symbols, different frequency hopping position within each uplink transmission, and/or a special case of UL timing mis-alignment. Such misalignment may occur, for example, if one of the channels is a RACH channel, in which case the exact timing of the RACH may not be aligned with the uplink transmissions in the other RAT.

According to a first option, misaligned LTE-NR uplink transmissions may be treated as an error case, at least in some cases. For example, misaligned LTE-NR uplink transmissions may be treated as an error case except when a PRACH transmission from one RAT (e.g., RAT A-either from LTE or NR) overlaps with another type of uplink channel transmissions (e.g., SRS, PUCCH, PUSCH) from the other RAT (e.g., RAT B). In the latter case, PRACH may be prioritized and other (non-RACH) uplink channel is dropped. In some cases, an NR RACH procedure transmission (e.g., a RACH preamble transmission, MSG 3 transmission, and/or HARQ-Ack feedback for MSG4 transmission), may be protected (not just the preamble/MSG1).

According to a second option, in case of an LTE transmission misaligned with an NR transmission, the NR transmission may be dropped. This approach may make sense, for example, because LTE may serve as an anchor RAT for NR (meaning an NR gNB may be able to reach a UE through an anchor network entity of LTE). An exception to this second option may be that when a PRACH from RAT A (either from LTE or NR) collides with a (non-RACH) uplink channel from RAT B, PRACH may be prioritized and the other channel is dropped.

As noted above, some solutions may be considered combined NW and UE based solutions. In such cases, similar assumptions may be made as before, except that channel boundaries may not have to be aligned.

For example, the assumptions may be that SCS is the same, for example, that SCS is the same (e.g., 15 KHZ) for both RATs, and symbol boundaries are aligned (e.g., as in a synchronized network). As noted above, in such cases, UL Timing may be aligned with minimal error (e.g., less than tens to hundreds of ns). For combined NW and UE-based solutions, RACH occasions may also be aligned.

A UE may also be configured to exhibit behavior designed to maintain phase coherency or, at least, reduce the impact of transmission power changes on phase coherency. In some cases, a UE may be configured with TTI configurations or transmit opportunities for certain uplink channels that are designed to reduce the impact of transmission power changes on phase coherency. For example, transmission opportunities in different RATs may overlap. For example, 2 symbols for NR slot transmission may overlap a 13 or 14 symbol LTE subframe.

If NR and LTE allocations (and channel boundaries) are known in advance (e.g., an NR allocation is known at the same time as an LTE allocation) at the UE, the UE may be able to take action designed to maintain phase coherency. For example, the UE may adjust analog settings (for power amplifiers) using the overlapping portions with highest combined power, and/or adjust digital gain settings to changes called for outside the overlap regions with highest combined power.

In some cases, LO leakage and analog emissions may be based on the higher power overlaps, so these techniques may be detected by observing non-overlap regions.

Even if NR and LTE allocations (and channel boundaries) are not known in advance at the UE, the UE may still take action to reduce the impact of transmission power changes on phase coherency. For example, if the resource allocation for an NR uplink transmission is not known at the time when the UE executes the transmit (Tx) automatic gain control (AGC) for LTE uplink transmissions, the UE may still have options when performing transmit (Tx) automatic gain control (AGC) algorithms.

For example, a UE may either (1) drop the NR uplink transmission, (2) backoff the power of NR uplink transmission to fit within the current gain state set by LTE, or (3) the UE may transmit both LTE and NR as expected.

In some cases, the UE may always assume NR is present with a maximum allowed power, for example, assuming a reasonable power spectral density (PSD) delta between LTE and NR and use that assumption to derive analog settings.

In some cases, the UE may calibrate for the analog and/or digital phase deltas (as accurately as possible/practical) so that a transmission remains coherent even if there is a power change.

The UE may also handle RACH procedures, in the manner described above (e.g., what may be referred to as he NW driven solution). For example, the UE may prioritize a RACH transmission in one RAT over a (non-RACH) transmission in the other RAT (e.g., and drop the non-RACH transmission). In the event of a simultaneous RACH in both RATs, the UE may prioritize one RAT over the other. For example, the UE may transmit the RACH for the one RAT and drop the RACH of the other RAT.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c"

is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

For example, means for transmitting and/or means for receiving may comprise one or more of a transmit processor 420, a TX MIMO processor 430, a receive processor 438, or antenna(s) 434 of the base station 110 and/or the transmit processor 464, a TX MIMO processor 466, a receive processor 458, or antenna(s) 452 of the user equipment 120. For example, various operations shown in FIG. 8 be performed by one or more processors of BS 110 shown in FIG. 4, such as controller/processor 440, while various operations shown in FIG. 9 be performed by one or more processors of UE 120 shown in FIG. 4, such as controller/processor 480.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for perform the operations described herein and illustrated in FIG. 8.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a user equipment (UE), comprising:
    determining the UE is sharing a same power amplifier to support at least first and second radio access technologies (RATs);
    receiving scheduling of an uplink transmission in the first RAT and receiving scheduling of an uplink transmission in the second RAT;
    detecting misalignment of the uplink transmissions in the first and second RATs;
    determining that a portion of the uplink transmission in the first RAT overlaps with the uplink transmission in the second RAT; and
    calibrating at least one of analog or digital phase change deltas such that the uplink transmissions remain coherent even when there is a transmission power change.

2. The method of claim 1, wherein:
    the first RAT comprises LTE;
    the second RAT comprises NR.

3. The method of claim 1, further comprising setting analog settings based on the overlapping portions with a highest combined power, if the scheduling information of the uplink transmission in the first RAT and the scheduling information of the uplink transmission in the second RAT is received at or before a time period.

4. The method of claim 1, further comprising adjusting digital gain outside the overlapping portions.

5. The method of claim 1, further comprising at least one of:
    dropping transmissions in one of the first or second RAT, or
    backing off transmission power in the one of first or second RAT based on a gain set by the other of the first or second RAT, if the scheduling information is not received at or before a time period.

6. The method of claim 1, further comprising:
    assuming transmission opportunities for the first or second RAT are present with a maximum allowed power; and
    using the assumption to derive analog gain settings.

7. The method of claim 1, wherein treating the misaligned uplink transmissions in the first and second RATs as an error case comprises treating misaligned uplink transmissions in the first and second RATs as an error case based on a determination that neither of the misaligned uplink transmissions are RACH transmissions.

8. The method of claim 1, further comprising:
    determining priorities associated with each uplink transmission in the first and second RATs;
    transmitting a first channel with higher priority; and
    dropping a second channel with lower priority.

9. The method of claim 8, further comprising:
    giving priority to a random access channel (RACH) transmission in one of the first or second RAT over another type of transmission in the other of the first or second RAT;
    giving priority to a random access channel (RACH) transmission in one of the first or second RAT over a RACH transmission in the other of the first or second RAT; or giving a non-RACH transmission in the first RAT priority over a non-RACH transmission in the second RAT, upon a determination that none of the first and second channels are RACH.

10. The method of claim 1, wherein detecting the misalignment comprises at least one of:
    detecting at least one of different starting or ending symbols;
    detecting different frequency hopping position within each uplink transmission; or
    detecting uplink timing misalignment.

11. A method for wireless communications by a user equipment (UE), comprising:
    determining the UE is sharing a same power amplifier to support at least first and second radio access technologies (RATs);
    receiving scheduling of an uplink transmission in the first RAT and receiving scheduling of an uplink transmission in the second RAT;
    detecting misalignment of the uplink transmissions in the first and second RATs;
    determining that a portion of the uplink transmission in the first RAT overlaps with the uplink transmission in the second RAT; and
    treating, as an error case, the detected misalignment of the uplink transmissions in the first and second RATs when neither of the misaligned transmissions is a random access channel (RACH) transmission; and
    when one of the misaligned uplink transmissions comprises a RACH transmission in one of the first RAT or second RAT, prioritizing the RACH transmission in the one of the first or second RAT over another channel transmission in the other of the first RAT or the second RAT.

12. The method of claim 11, wherein detecting the misalignment comprises at least one of:
    detecting at least one of different starting or ending symbols;
    detecting different frequency hopping position within each uplink transmission; or
    detecting uplink timing misalignment.

13. An apparatus for wireless communications by a user equipment (UE), comprising:
    means for determining the UE is sharing a same power amplifier to support at least first and second radio access technologies (RATs);
    means for receiving scheduling of an uplink transmission in the first RAT;
    means for receiving scheduling of an uplink transmission in the second RAT;
    means for detecting misalignment of the uplink transmissions in the first and second RATs;
    means for determining that a portion of the uplink transmission in the first RAT overlaps with the uplink transmission in the second RAT; and
    means for calibrating at least one of analog or digital phase change deltas such that the uplink transmissions remain coherent even when there is a transmission power change.

14. A non-transitory computer-readable medium comprising instructions that, when executed by a processor of a user equipment (UE), cause the processor to:
    determine the UE is sharing a same power amplifier to support at least first and second radio access technologies (RATs);
    receive scheduling of an uplink transmission in the first RAT and scheduling of an uplink transmission in the second RAT;
    detect misalignment of the uplink transmissions in the first and second RATs, wherein in order to detect the misalignment of the uplink transmissions,
    determine that a portion of the uplink transmission in the first RAT overlaps with the uplink transmission in the second RAT; and
    calibrate at least one of analog or digital phase change deltas such that the uplink transmissions remain coherent even when there is a transmission power change.

15. A user equipment (UE), comprising:
    a memory; and
    a processor configured to:
    determine the UE is sharing a same power amplifier to support at least first and second radio access technologies (RATs);
    receive scheduling information of an uplink transmission in the first RAT and scheduling information of an uplink transmission in the second RAT;
    detect misalignment of the uplink transmissions in the first and second RATs, wherein in order to detect the misalignment of the uplink transmissions,
    determine that a portion of the uplink transmission in the first RAT overlaps with the uplink transmission in the second RAT; and
    calibrate at least one of analog or digital phase change deltas such that the uplink transmissions remain coherent even when there is a transmission power change.

16. The UE of claim 15, wherein:
    the first RAT comprises LTE;
    the second RAT comprises NR.

17. The UE of claim 15, wherein the at least one processor is further configured to set analog settings based on the overlapping portions with a highest combined power, if the scheduling information of the uplink transmission in the first RAT and the scheduling information of the uplink transmission in the second RAT is received at or before a time period.

18. The UE of claim 15, wherein the at least one processor is further configured to adjust digital gain outside the overlapping portions.

19. The UE of claim 15, wherein the at least one processor is further configured to at least one of:
    drop transmissions in one of the first or second RAT, or back off transmission power in the one of first or second RAT based on a gain set by the other of the first or second RAT, if the scheduling information is not received at or before a time period.

20. The UE of claim 15, wherein the at least one processor is further configured to:
    assume transmission opportunities for the first or second RAT are present with a maximum allowed power; and
    use the assumption to derive analog gain settings.

21. The UE of claim 15, wherein the processor is configured to treat the misaligned uplink transmissions in the first and second RATs as an error case based on a determination that none of the uplink transmissions are RACH transmissions.

22. The UE of claim 15, wherein the at least one processor is further configured to:
    determine priorities associated with each uplink transmission in the first and second RATs;
    transmit a first channel with higher priority; and
    drop a second channel with lower priority.

23. The UE of claim 22, wherein the at least one processor is further configured to:

give priority to a random access channel (RACH) transmission in one of the first or second RAT over another type of transmission in the other of the first or second RAT;
give priority to a random access channel (RACH) transmission in one of the first or second RAT over a RACH transmission in the other of the first or second RAT; or
give a non-RACH transmission in the first RAT priority over a non-RACH transmission in the second RAT, upon a determination that none of the first and second channels are RACH.

24. A user equipment (UE), comprising:
a memory; and
a processor configured to:
  determine the UE is sharing a same power amplifier to support at least first and second radio access technologies (RATs);
  receive scheduling of an uplink transmission in the first RAT and scheduling of an uplink transmission in the second RAT;
  detect misalignment of the uplink transmissions in the first and second RATs;
  determine that a portion of the uplink transmission in the first RAT overlaps with the uplink transmission in the second RAT;
  treat, as an error case, the detected misalignment of the uplink transmissions in the first and second RATs when neither of the misaligned transmissions is a random access channel (RACH) transmission; and
  prioritize the RACH transmission in the one of the first or second RAT over another channel transmission in the other of the first RAT or the second RAT.

25. The UE of claim 24, wherein in order to detect the misalignment the processor is further configured to at least one of:
  detect at least one of different starting or ending symbols;
  detect different frequency hopping position within each uplink transmission; or
  detect uplink timing misalignment.

* * * * *